(12) United States Patent  (10) Patent No.: US 8,797,409 B1
Heinke  (45) Date of Patent: *Aug. 5, 2014

(54) THERMAL IMAGING DEVICE, METHOD, AND SYSTEM PROVIDING LOCAL AND REMOTE DISPLAYS

(71) Applicant: Fluke Corporation, Everett, WA (US)

(72) Inventor: Thomas Heinke, Santa Cruz, CA (US)

(73) Assignee: Fluke Corporation, Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/724,261

(22) Filed: Dec. 21, 2012

Related U.S. Application Data

(63) Continuation of application No. 11/711,886, filed on Feb. 28, 2007, now Pat. No. 8,339,457.

(51) Int. Cl.
H04N 5/33 (2006.01)

(52) U.S. Cl.
USPC ............ 348/164; 348/166; 250/330; 250/332

(58) Field of Classification Search
USPC .......................... 348/164–168; 250/330–334
See application file for complete search history.

(56) References Cited

U.S. PATENT DOCUMENTS

| | | | |
|---|---|---|---|
| 5,014,129 A | 5/1991 | Imanishi | |
| 5,107,117 A | 4/1992 | Ennenga | |
| 5,160,842 A | 11/1992 | Johnson | |
| 5,386,117 A | 1/1995 | Piety | |
| 5,637,871 A | 6/1997 | Piety | |
| 5,677,532 A | 10/1997 | Duncan | |
| 5,812,112 A | 9/1998 | Helfferich | |
| 5,856,931 A | 1/1999 | McCasland | |
| 6,594,621 B1 | 7/2003 | Meeker | |
| 6,606,115 B1 | 8/2003 | Alicandro | |
| 6,849,849 B1 | 2/2005 | Warner | |
| 7,454,050 B2 | 11/2008 | Garvey | |
| 7,459,107 B2 | 12/2008 | Yamashita | |
| 7,561,200 B2 | 7/2009 | Garvey, III | |
| 7,847,251 B1 | 12/2010 | Praly | |
| 7,897,919 B2 | 3/2011 | King | |
| 8,339,457 B1 * | 12/2012 | Heinke | ......................... 348/164 |

(Continued)

OTHER PUBLICATIONS

"InsideIR: Thermal Image Analysis Software Users Manual," Fluke Corporation, Everett, Wash., Jan. 2006, Rev. 1, 7/07, 38 pages.

(Continued)

*Primary Examiner* — Bharat N Barot
(74) *Attorney, Agent, or Firm* — Christensen O'Connor Johnson Kindness PLLC

(57) ABSTRACT

An imaging device for real-time display of image data on a local display and on a remote display is disclosed. In some embodiments, the imaging device can include an imaging engine, a memory device for storing image data, and a processor for receiving the image data from the imaging engine, storing the image data in the memory device, retrieving the image data from the memory device, and transmitting the image data to both a local display and remote display so that the image data can be viewed on both the remote display and local display simultaneously.

20 Claims, 3 Drawing Sheets

(56) References Cited

U.S. PATENT DOCUMENTS

| | | |
|---|---|---|
| 2004/0021773 A1 | 2/2004 | Hayakawa |
| 2005/0104771 A1 | 5/2005 | Terry |
| 2006/0017821 A1 | 1/2006 | Garvey, III |
| 2007/0034798 A1 | 2/2007 | Hamrelius |
| 2007/0087311 A1 | 4/2007 | Garvey, III |
| 2008/0211915 A1 | 9/2008 | McCubbrey |
| 2008/0308732 A1 | 12/2008 | Warnke |
| 2009/0009596 A1 | 1/2009 | Kerr |
| 2010/0277595 A1 | 11/2010 | Reed |

OTHER PUBLICATIONS

"Ti20: Thermal Imager Users Manual," Fluke Corporation, Everett, Wash., Jan. 2006, 68 pages.

* cited by examiner

THERMAL IMAGING DEVICE, METHOD, AND SYSTEM PROVIDING LOCAL AND REMOTE DISPLAYS

CROSS-REFERENCE TO RELATED APPLICATIONS

This application is a continuation of U.S. Pat. No. 8,339,457, filed Feb. 28, 2007, issued Dec. 25, 2012, entitled "Systems And Methods For Time-Shared Memory Access In A Thermal Imaging Device," the disclosure of which is hereby incorporated in its entirety.

TECHNICAL FIELD

The following is related to a system architecture for sharing memory access among components in an imaging device and, more particularly, for sharing memory access to allow for real-time display of image data on both a remote display and a local display.

BACKGROUND

Infrared thermal imaging instruments are commonly used for obtaining temperature profiles of objects such as industrial machines or components of operating equipment. Inspecting an object's operating temperature conditions can reveal whether a failure is imminent or a machinery adjustment is necessary.

Imaging instruments typically sense an image using an array of sensors and store data representing the scene in a memory located in the instrument. The stored image data can then be presented to a user on a local display integrated into the imaging instrument. Typically, the stored image data can also be transferred to a host computer for remote display and further processing.

To date, existing imaging solutions have not been capable of imaging a scene using a sensor array in an imaging device and displaying a real-time image of the scene on both an integrated or local display and on a remote display on a host computer. For quite a few applications, however, it is desirable to display an image on both a local display on an imaging instrument and on a remote display in real-time, as well as to provide additional benefits.

The headings provided herein are for convenience only and do not necessarily affect the scope or meaning of the claimed invention.

DETAILED DESCRIPTION

In a broad sense, systems and methods for operating and imaging device to sense and store image data are disclosed in detail below. An imaging engine forming part of the imaging device can include any form or type of imaging array. In some embodiments, the imaging array can be a two-dimensional array of sensors configured to record infra-red thermal image data. In other embodiments, the imaging array can be configured to record visible-light images.

While these systems and methods described herein are applicable to portable imaging devices, they can also be used in immobile devices, permanently tethered devices, or in any other device or environment in which image data is transferred between an imaging engine and a host computer or where image data is to be synchronized in real-time between local and remote displays.

The systems and methods described herein can be used for sharing access to a single-port memory among various components in an imaging device to allow for real-time display of image data simultaneously on both a host computer and on an attached LCD.

Camera Management Board

Figure 1:
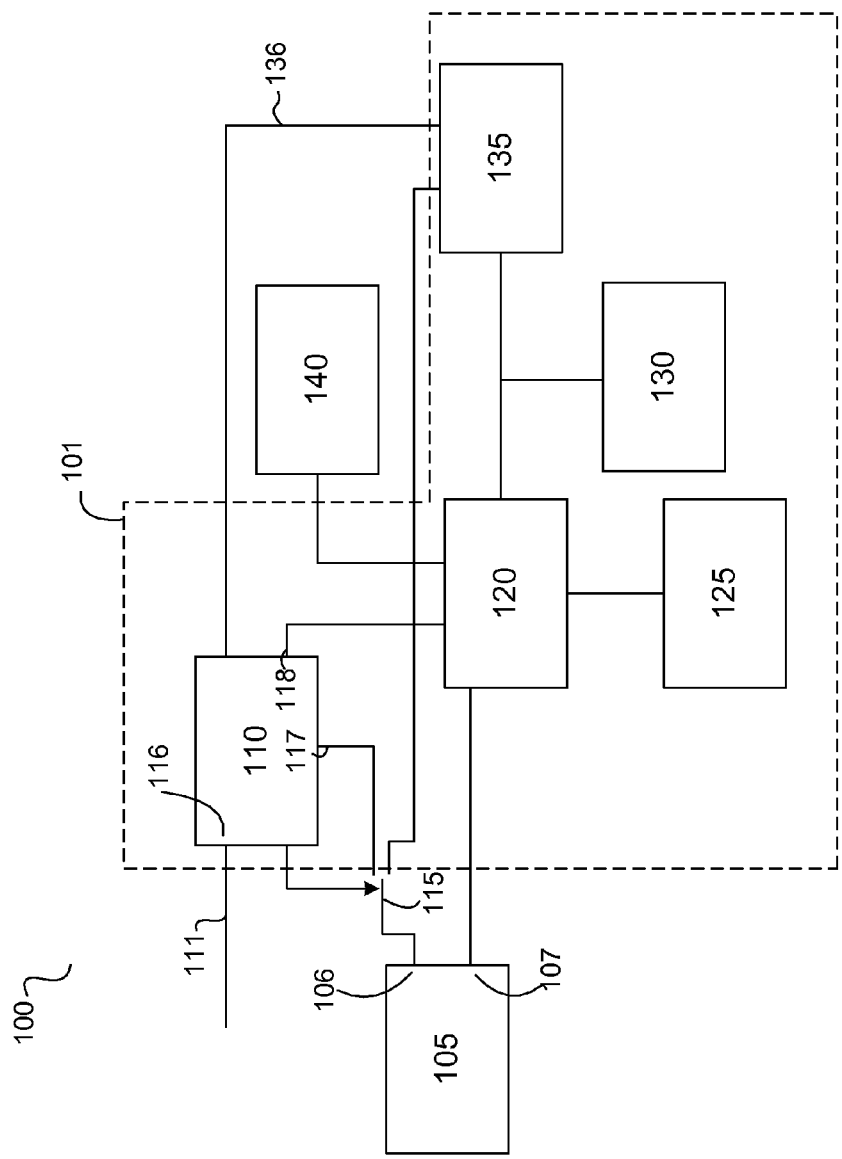
FIG. 1 illustrates a block diagram of components for an imaging device.

An imaging device can include a Camera Management Board (CMB) which can include components for supporting an imaging engine. An example CMB is illustrated in FIG. 1. The CMB 101 of an imaging device 100 can be coupled to an imaging engine 105 for capturing image data and can include an external interface 110, a central processor 120, memory 125, memory 130, and a signal processor 135. The CMB 101 can be further coupled to local LCD 140 via central processor 120. These components can be coupled in the manner described below. As a non-limiting example, in some embodiments, memory 125 can be a SRAM (static random access memory) and memory 130 can be a non-volatile memory, such as a flash ROM.

The central processor 120 of the CMB 101 can be any type of processor that can be configured to transport data between various functional units of the CMB 101 and perform other logical and/or processing functions. As examples, central processor 120 can be an FPGA (field programmable gate array), an ASIC (application-specific integrated circuit), or any other type of device that can be configured to operate on or otherwise process image data.

Imaging Engine

The imaging device can include any one of various different types of imaging engines. When used for infrared imaging, the imaging engine can include an infrared array, a lens, an electronics for supporting the array and for performing the primary signal processing to convert a scene to an output signal comprised of an array of temperatures. In one embodiment, the imaging engine 105 can be an SCC500 provided by BAE Systems.

As illustrated in FIG. 1, the imaging engine 105 can have a bi-directional auxiliary data port 106 and a primary temperature data port 107. The temperature array data can be output from port 107 via a high speed serial LVDS (low voltage differential signaling) line. In some embodiments, output port 107 can be configured to output a signal with a period of 163 ns or a frequency of 6.136 MHz. Auxiliary port 106 can be coupled to switch 115. Operation of switch 115 is discussed in more detail below. Imaging engine 105 also can be used to store firmware for its operation. As described in more detail below, the output of primary temperature data port 107 can be provided to a host computer for remote display and also can be processed in the imaging device 100 for display on a local LCD.

Camera Management Board Local Image Storage

Image data captured by imaging engine 105 can be output through output port 107. In some embodiments, imaging engine 105 can output data on primary temperature data port 107 without knowing the status of components to which it is coupled. The imaging engine 105 can be configured to operate continuously in the absence of input instructions. However, a device such as interface controller 110 may not always be ready to receive data and a direct connection from primary output 107 to interface controller 110 may therefore not be desirable. For example, even if interface controller 110 is coupled to a relatively fast shared bus line, there may be other devices on the bus which prevent interface controller 110 from sending its data.

To alleviate this condition, the data at output port 107 can be processed by central processor 120 and then stored into memory 125. After storage in memory 125, memory 125 can provide, by way of central processor 120, the image data to signal processor 135 for further processing. Imaging device 100 can also include a button such as a shutter button (not shown) which can be actuated to cause the image data to be written into a non-volatile memory such as memory 130. To further improve data flow, interface controller 110 can include a buffer such as a FIFO. In some embodiments, the buffer can have 512 bytes of storage. In this manner, image data can be sensed and stored while a host computer is not connected to the imaging device.

Camera Management Board Image Recall for Local Display

CMB 101 can be used to retrieve data for display on a local or attached LCD screen. Image data can be retrieved from memory 130 and loaded into signal processor 135. The image data can be processed in signal processor 135 and then be stored into the memory 125 through central processor 120. Once stored in memory 125, an internal state machine which drives LCD 140 can be used to retrieve the image data from memory 125 via central processor 120.

Signal processor 135 can be used to perform various processing functions on the image data. For example, signal processor 135 can be used to overlay display controls which can appear with a thermal image on the LCD 140. In some embodiments, memory 125 and memory 130 can both store the same array of temperature data. For example, image data can be stored in a non-volatile memory such as memory 130 and then copied to an SRAM such as memory 125 before display.

In some embodiments, for local display of image data, a data signal on primary temperature data port 107 is received by central processor 120 and stored into memory 125. Data is then read from memory 125 by signal processor 135 through action of central processor 120. The data processed by signal processor 135 is then stored in a memory 125. Image data in memory 125 can then moved by central processor 120 from memory 125 to LCD 140.

Camera Management Board Image Recall for Remote Display

In some circumstances, a user may wish to transfer temperature data to a host computer for further processing and display of data on host computer. For example, software running on a server computer can be used to draw an area of interest on an image and perform various functions such as calculating average temperatures and checking temperatures against predefined limits, generating and creating alarms, etc.

Using the systems and methods described herein, real-time data can be transferred to the host computer via external interface controller 110 without interrupting processing inside imaging device 100. The external interface controller 110 can be any interfacing means for transferring data between a host computer and a peripheral device. In some embodiments, a USB protocol can be used. In other embodiments, a FireWire protocol or any other protocol can be used.

Central processor 120 can be used to coordinate the processing of image data. Central processor 120 can be used to provide address data for the memory 130. Central processor 120 can move data into a FIFO buffer on interface controller 110. The interface controller 110 can include a microcontroller with a USB (Universal Serial Bus) engine. Interface controller 110 can be connected to a USB or other bus on port 116 and connected to internal systems on ports 117 and 118. In some embodiments, interface controller 110 can include a USB state machine and a FIFO memory. The state machine can be configured to determine when data is in the controller's FIFO and the controller 110 can transfer data from the FIFO to the USB bus on port 116. As long as the internal buffer is not full, interface controller 110 can receive additional data. Thus, interface controller 110 can operate on its own. In some embodiments, interface 110 controller can be an EZUSB chip available from Cypress Semiconductor.

Once data is stored in the FIFO on the interface controller 110, the data can then be moved into a host computer via output line 111 when the imaging device 100 is coupled to a host computer. In some embodiments, when not connected to a host computer, the memory 130 remains connected to signal processor 135. However, to avoid address conflicts when the imaging device 100 is connected to a host computer, the signal processor 135 can be put into a quiet mode so that it does not use the address bus.

The state machine inside central processor 120 can move data from memory 125 into interface controller 110 which then provides the data to a host computer. At the host computer, a software application can be used to make the data available to a user and can store the data for further processing.

Camera Management Board Parameter Storage

In some cases, it may be desirable to download parameter data to the imaging device from a host computer. For example, routing information can be downloaded to the imaging device. Software running on a host computer can be used to set up a route. This route data can then be downloaded to the imaging device. Systems and methods for routing are further described in U.S. patent application Ser. No. 11/463,234 entitled "SYSTEM AND METHOD FOR CONFIGURING A THERMAL IMAGING INSTRUMENT," the contents of which are herein incorporated by reference in their entirety.

Route data from host computer can be downloaded to memory 130. The route data can be received by interface controller 110, forwarded to central processor 120, and processed by signal processor 135. Signal processor 135 can then store the data in memory 130. This method can also be used to store a firmware update for the system and for the user interface. A non-volatile memory such as memory 130 can be used to store routing information, image data, and user interface information.

Signal processor 135 can be configurable to operate in different modes. In some embodiments, signal processor 135 can have an EMIF (Extended Memory Interface) mode. In this mode, the signal processor 135 can act as a microcontroller. That is, the commands and data can be provided from an external source. Signal processor 135 can also operate in a HPI (Host Port Interface) mode. In this mode, internal RAM is accessible from outside and the memory appears as memory to outside world. The signal processor 135 can operate on data stored in the memory.

Interface controller 110 can be used to signals a switch at the signal processor 135 between HPI and EMIF modes. The signal can be on line 136 which is used to couple interface controller 110 to signal processor 135.

Camera Management Board Calibration Mode

Auxiliary port 106 can be used for purposes other than transferring image data. In some embodiments, auxiliary data port 106 can be implemented according to the RS422 serial communication protocol. The auxiliary data port 106 can be coupled switch 115. The auxiliary port 106 can be used to send and receive setup parameters, and to see information such as example internal temperatures of the imaging engine 105, set target emissivity, etc. In some embodiments, auxiliary port 106 can be a low-speed serial connection.

At times, it may be desired to download calibration information to the imaging engine 105. Switch 115 can be used to select between interface controller 110 and signal processor 135. In some embodiments, switch 115 can support bi-directional communications. Switch 115 can be operable according to the RS422 protocol.

Thus, a firmware update or calibration commands can be received from a host computer on signal line 111 at interface controller 110. Interface controller 110 can output the calibration commands on port 117 to switch 115. From switch 115, the data or commands can be moved to auxiliary port 106 on imaging engine 105. Calibration commands can be sent to and received from imaging engine 105. Calibration of the imaging engine 105 can be performed without the use of signal processor 135 or memory 130. During calibration, real-time data can still be received from imaging engine 105 by central processor 120 via output port 107.

For example, imaging engine 105 can include a shutter. A shutter temperature can be measured in the imaging engine 105 and used as a reference temperature for calibration purposes. Internal temperatures can also include temperatures of the imaging array. This temperature data as well as other calibration data can be transferred to central processor 120 or to a host computer using the systems and methods described above.

Additionally, data and parameters can be loaded from signal processor 135 to imaging engine 105. Auxiliary port 106 can be used to modify parameters at the imaging engine 105. For example, emissivity data can be sent to the imaging engine 105 via the auxiliary port. Temperature calculation firmware can also be stored in imaging engine 105. These systems and methods can also be used to upload new firmware in imaging engine 105 through switch 115.

Imaging engine 105 can also send parameter data to signal processor 135 through switch 115. For example, the auxiliary port 106 can be used to request additional data not available at output port 107. This additional data can include shutter temperature data or engine temperature data which can be used to generate diagnostic warning signals. These systems and methods can be used to calibrate, recalibrate, or test imaging engine 105.

Shared Memory Access

As discussed above, imaging engine 105 may be configured to produce data on the temperature data port 107 data without reference to other events on imaging device 100. Memory 125 can be used to store data from imaging engine 105. Memory 125 can also be used for storing a locally displayed image. The imaging device can be configured to storing display data in one portion of memory 125 and imaging data in another portion of memory 125 so that a user can review an image while the imaging engine 105 is running and creating new data which is stored into memory 125.

In some embodiments, memory 125 can be 512 KB, a portion of which is used for image data. Memory 125 can also be used to buffer image data from imaging engine 105. When the buffer on interface controller 110 is ready, central processor 120 retrieves data from memory 125 and transfers the data into the buffer in interface controller 110 until the buffer is full. As discussed above, the buffer can be a FIFO. Data can be stored in the buffer of interface controller 110 until the buffer is full or the controller 110 is otherwise not ready.

In some modes, signal processor 135 retrieves data, manipulates it, then stores the data into memory 125 so that it can be available for display on LCD 140. Additionally, the data in memory 125 can be made available to a host computer.

Thus, at any time, unmodified image data in memory 125 or processed data from signal processor 135 stored in memory 125 can be retrieved. It may be useful to display a real-time image on a host computer and on the imaging device simultaneously. Image data can also be received from a host computer and stored into memory 125 for local display on LCD 140. In some embodiments, signal processor 135 may move data from one location to another within memory 125.

In some embodiments, memory 125 can have one address bus and one data bus. In such embodiments, one component can address memory 125 at a time. As described above, various different systems may have access demands on memory 125. For example, temperature data port 107 of imaging engine 105 may continually produce temperature data to be stored in memory 125. The high data-rate from imaging engine 105 places relatively high access demands on memory 125. Additionally, LCD 140 can have relatively strict timing requirements based on its refresh rate. Other non-temperature data may also need to be retrieved from or stored in memory 125.

By time-sharing memory 125, memory 125 can be implemented as a single-port memory. Access to memory 125 can be divided into an arbitrary number of time slots. In some embodiments, six time slots can be used. Thus, memory 125 can effectively function as a multi-port memory by time slices and thereby permit the pseudo-simultaneous access by multiple devices such as imaging engine 105, LCD 140, signal processor 135 and interface controller 110.

Image data from imaging engine 105 can temporarily stored in central processor 120 and then moved to memory 125. Thus, memory 125 can be used as a buffer to synchronize timings of imaging engine 105 and the interface controller 110. In some embodiments, central processor 120 can also include one or more FIFOs or buffers for storing the image data from temperature data port 107.

Figure 2:
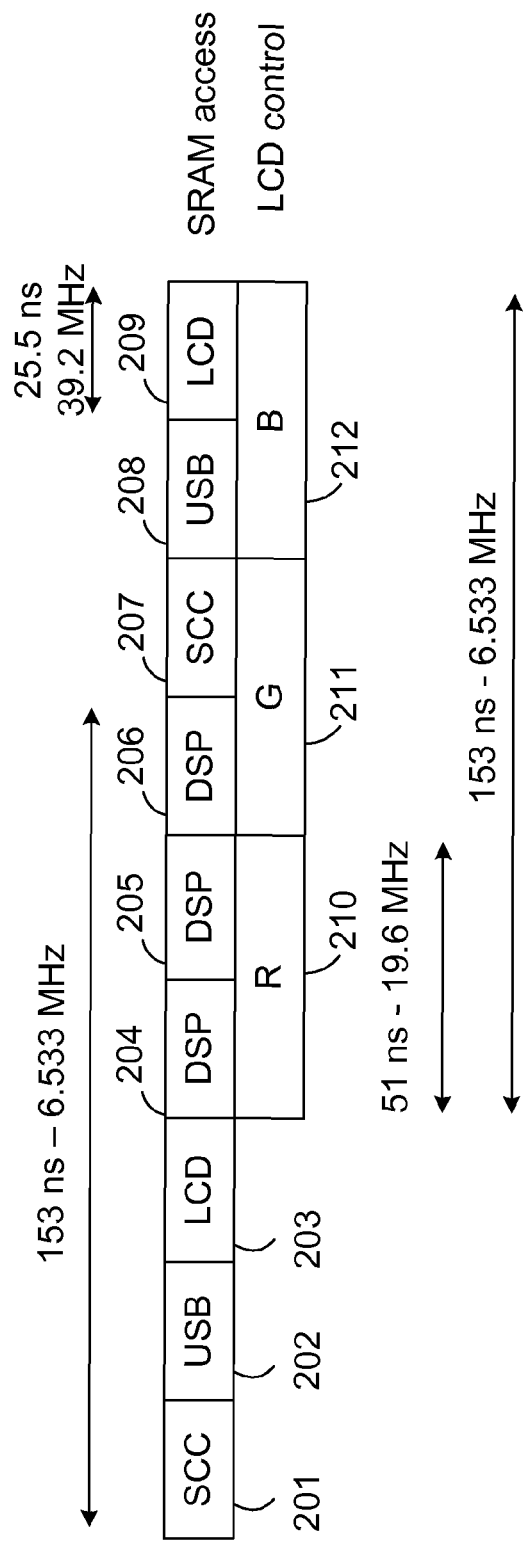
FIG. 2 illustrates a timing diagram for memory sharing in an imaging device.

With reference to FIG. 2, in time slot 201, if data is available from imaging engine 105, it is written into memory 125. At this time, the address bus on memory 125 can be connected to an address generator driven by imaging engine 105. In time slot 202, memory 125 can be connected to interface controller 110 for read and write access by a host computer. At this time, interface controller 110 can function as an address counter. In time slot 203, memory 125 can be coupled to LCD 140 for the purpose of refreshing the screen. In time slots 204-206, memory 125 can be coupled to signal processor 135. At time slot 207, the memory access cycle can restart. Time slots 207-209 as illustrated therefore correspond to time slots 201-203. In some embodiments, each display color red 210, green 211, and blue 212, can be transferred using two time slots.

Figure 3:
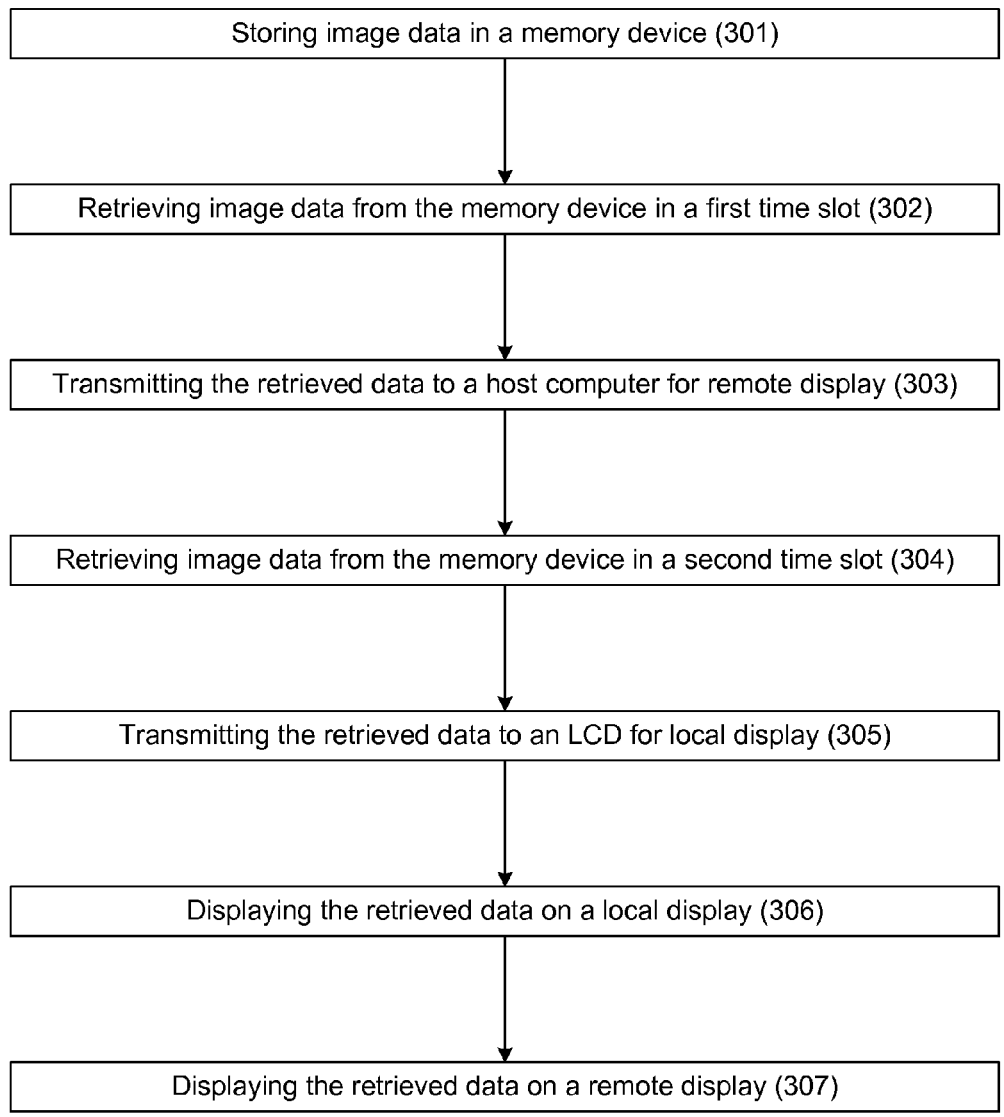
FIG. 3 illustrates a method for real-time imaging.

An exemplary method for processing image data in an imaging device is illustrated in FIG. 3. The method can include storing the image data in a memory device (301), retrieving image data from the memory device in a first time slot (302), transmitting the retrieved data to a host computer for remote display (303), retrieving image data from the memory device in a second time slot (304), transmitting the retrieved data to an LCD for local display (305), displaying the retrieved data on a local display (306), and displaying the retrieved data on a remote display (307).

In some embodiments, the image data retrieved during the first time slot and second time slot can represent the same thermal imaging temperature data. In other embodiments, the image data retrieved in the first time slot and second time slot can represent different portions of the stored thermal imaging temperature data. In some embodiments, either of the data retrieved in the first and second time slots can be transmitted to either a remote display or a local display.

CONCLUSION

Many specific details of certain embodiments of the invention are set forth in the description and in FIGS. 1-3 to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention. As used herein, one or more components "coupled" to each other can be coupled directly (i.e., no other components are between the coupled components) or indirectly (i.e., one or more other components can be placed between the coupled components).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined or altered to provide further embodiments.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein.

The terminology used in the Detailed Description is intended to be interpreted in its broadest reasonable manner, even though it is being used in conjunction with a detailed description of certain specific embodiments of the invention. Certain terms may even be emphasized; however, any terminology intended to be interpreted in any restricted manner will be overtly and specifically defined as such in this Detailed Description section. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as a means-plus-function claim under 35 U.S.C sec. 112, other aspects may likewise be embodied as a means-plus-function claim. Accordingly, the inventors reserve the right to add additional claims after filing the application to pursue such additional claim forms for other aspects of the invention.

I claim:

1. A thermal imaging device, comprising:
    an imaging engine configured to generate thermal image data, the thermal image data representing a two-dimensional array of temperature values;
    a memory device for storing the thermal image data; and
    a first processor configured to:
        receive the thermal image data from the imaging engine;
        store the thermal image data in the memory device; and
        transmit the stored thermal image data for display on a local display and a remote display for display during overlapping time periods.

2. The thermal imaging device of claim 1, wherein the memory device is a single-port memory.

3. The thermal imaging device of claim 1, wherein the memory device has a predetermined number of ports, the number of ports being fewer than the number of devices having access to the memory device.

4. The thermal imaging device of claim 1, further comprising a local display and wherein the thermal image data is simultaneously displayed on both the local display and the remote display.

5. The thermal imaging device of claim 1, further comprising a signal processor coupled to the first processor, the signal processor configured to:
    receive thermal image data from the first processor;
    perform one or more processing functions on the thermal image data; and
    transmit the thermal image data to the first processor for storing in the memory device.

6. The thermal imaging device of claim 1, further comprising an interface controller coupled to the first processor, the interface controller configured to:
    receive thermal image data from the first processor; and
    store the thermal image data in an internal buffer.

7. The thermal imaging device of claim 6, wherein the interface controller is further coupled to a signal processor for selecting an operating mode of the signal processor.

8. The thermal imaging device of claim 6, wherein the interface controller is further configured to transmit the stored thermal image data to a host computer.

9. The thermal imaging device of claim 1, further comprising a switch coupled to an auxiliary data port on the imaging engine for coupling the auxiliary data port to either an interface controller or a signal processor.

10. The thermal imaging device of claim 9, wherein the interface controller is configured to receive calibration data from a host computer and transmit that data through the switch to the imaging engine.

11. A method for processing image data captured on an imaging device, comprising:
- receiving, by a first processor, thermal image data from an imaging engine, wherein the thermal image data comprises a two-dimensional array of temperature values;
- storing the thermal image data in a memory device; and
- transmitting, by the first processor, the stored thermal image data for display on a local display and a remote display for display during overlapping time periods.

12. The method of claim 11, wherein storing the thermal image data in a memory device comprises storing the thermal image data in a single-port memory device.

13. The method of claim 11, further comprising simultaneously displaying the thermal image data on both the local display and the remote display.

14. The method of claim 11, further comprising:
- receiving thermal image data from the first processor at a signal processor;
- performing one or more processing functions on the thermal image data at the signal processor; and
- storing the thermal image data in the memory device.

15. The method of claim 14, further comprising:
- receiving thermal image data from the first processor at an interface controller; and
- storing the thermal image data in a buffer internal to the interface controller.

16. The method of claim 15, further comprising selecting an operating mode of the signal processor at the interface controller.

17. The method of claim 11, further comprising receiving calibration data from a host computer and transmitting that data through a switch to the imaging engine.

18. A system for processing image data captured on an imaging device, comprising:
- a receiving means for receiving thermal image data from an imaging engine, wherein the thermal image data comprises a two-dimensional array of temperature values;
- a storing means for storing the thermal image data in a memory device; and
- a transmitting means for transmitting the thermal image data for display on a local display and a remote display during overlapping time periods.

19. The system of claim 18, further comprising a means for simultaneously displaying the thermal image data on both the local display and the remote display.

20. The system of claim 18, further comprising a means for coupling the memory device to a plurality of other devices each of which can access the memory device through a single port.

* * * * *